United States Patent
Kim

(10) Patent No.: US 7,663,598 B2
(45) Date of Patent: Feb. 16, 2010

(54) BACKLIGHT ASSEMBLY DRIVING APPARATUS FOR LIQUID CRYSTAL DISPLAY

(75) Inventor: Pu Jin Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 596 days.

(21) Appl. No.: 11/476,757

(22) Filed: Jun. 29, 2006

(65) Prior Publication Data
US 2007/0205977 A1 Sep. 6, 2007

(30) Foreign Application Priority Data
Mar. 3, 2006 (KR) .................. 10-2006-0020427

(51) Int. Cl.
G09G 3/36 (2006.01)
(52) U.S. Cl. ..................... 345/102; 345/46; 345/82
(58) Field of Classification Search .............. 345/46, 345/82, 102
See application file for complete search history.

(56) References Cited
U.S. PATENT DOCUMENTS

| | | | |
|---|---|---|---|
| 5,859,592 A * | 1/1999 | Carlin ............... | 340/815.45 |
| 6,888,529 B2 * | 5/2005 | Bruning et al. ............ | 345/102 |
| 2003/0117088 A1 * | 6/2003 | Tanabe et al. .............. | 315/291 |
| 2004/0090403 A1 * | 5/2004 | Huang ..................... | 345/82 |
| 2005/0231459 A1 * | 10/2005 | Furukawa .................. | 345/102 |
| 2005/0243022 A1 * | 11/2005 | Negru ..................... | 345/46 |
| 2006/0038803 A1 * | 2/2006 | Miller et al. ............... | 345/204 |
| 2006/0050048 A1 * | 3/2006 | Lee et al. .................. | 345/102 |
| 2007/0159750 A1 * | 7/2007 | Peker et al. ............... | 361/93.1 |
| 2007/0188425 A1 * | 8/2007 | Saccomanno ............... | 345/82 |

* cited by examiner

Primary Examiner—Amare Mengistu
Assistant Examiner—Dmitriy Bolotin
(74) Attorney, Agent, or Firm—Holland & Knight LLP

(57) ABSTRACT

A backlight assembly driving apparatus for a liquid crystal display device includes a light emitting diode string of serially connected light emitting diodes, and switching devices connected in parallel to and in a one-to-one correspondence with the light emitting diodes to conduct or turn off current applied to a correspondingly parallel-connected light emitting diode.

19 Claims, 7 Drawing Sheets

BACKLIGHT ASSEMBLY DRIVING APPARATUS FOR LIQUID CRYSTAL DISPLAY

This application claims the benefit of the Korean Patent Application No. P2006-0020427 filed on Mar. 3, 2006, which is hereby incorporated in its entirety.

BACKGROUND OF THE INVENTION

1. Field of the Invention

This invention relates to a light source, and more particularly to a backlight assembly driving apparatus for a liquid crystal display. Although the present invention is suitable for a wide scope of applications, it is particularly suitable for normally operating light emitting diodes in a backlight although a malfunction has occurred in one of the light emitting diodes.

2. Description of the Related Art

Generally, a liquid crystal display (LCD) controls light transmittance of liquid crystal cells in accordance with video signals, to thereby display a picture. An active matrix type of liquid crystal display device uses a switching device in each liquid crystal cell so that each liquid cell can be actively switched. Such active switching increases response speed so that moving pictures can be displayed on the liquid crystal display device. The switching device used for the active matrix liquid crystal display device is typically a thin film transistor (TFT).

FIG. 1 is an equivalent circuit diagram of a pixel provided at a liquid crystal display device. A gate electrode of the TFT is connected to the gate line GL while a source electrode thereof is connected to a data line DL. Further, a drain electrode of the TFT is connected to a pixel electrode of the liquid crystal cell Clc and to one electrode of a storage capacitor Cst. A common electrode of the liquid crystal cell Clc is supplied with a common voltage Vcom. The active matrix LCD converts a digital input data into an analog data voltage on the basis of a gamma reference voltage. When the analog data voltage is supplied to the data line DL while a scanning pulse is supplied to the gate line GL, a channel between the source electrode and the drain electrode thereof, thereby supplying a data voltage on the data line DL to the pixel electrode to thereby charge the liquid crystal cell Clc. Thus, the storage capacitor Cst receives the data voltage fed from the data line DL when the TFT is turned ON, and then maintains the data voltage in the liquid crystal cell when the TFT is turned OFF. In response to the data voltage on the pixel electrode, liquid crystal molecules of the liquid crystal cell are reoriented by an electric field between the pixel electrode and the common electrode, to thereby modulate light.

FIG. 2 is a block diagram of a related art liquid crystal display device. As shown in FIG. 2, a liquid crystal display device 100 includes a liquid crystal display panel 110 having thin film transistors (TFTs) for driving the liquid crystal cells Clc adjacent to where data lines DL1-DLm and gate lines GL1-GLn crossing each other, a data driver 120 for supplying data to the data lines DL1-DLm of the liquid crystal display panel 110, a gate driver 130 for supplying a scanning pulse to the gate lines GL1-GLn of the liquid crystal display panel 110, a gamma reference voltage generator 140 for providing a gamma reference voltage to the data driver 120, a backlight assembly 150 for irradiating light onto the liquid crystal display panel 110, an inverter 160 for applying AC voltage and current to the backlight assembly 160, a common voltage generator 170 for providing a common voltage Vcom to the common electrode of the liquid crystal cells Clc of the liquid crystal display panel 110, a gate driving voltage generator 180 for providing a gate high voltage VGH and a gate low voltage VGL to the gate driver 130, and a timing controller 190 for controlling the data driver 120 and the gate driver 130. The liquid crystal display panel 110 has a layer of liquid crystal positioned between two glass substrates. The data lines DL1-DLm and the gate lines GL1-GLn perpendicularly cross each other on the lower glass substrate of the liquid crystal display panel 110. Each crossing of the data lines DL1-DLm and the gate lines GL1-GLn is provided with a TFT.

The TFTs of the liquid crystal display panel 110 switches data on the data lines DL1-DLm to the liquid crystal cells Clc in response to scanning pulses on the gate lines GL1-GLn. The gate electrode of a TFT is connected to gate lines while the source electrode thereof is connected to a data line. Further, the drain electrode of the TFT is connected to the pixel electrode of the liquid crystal cell Clc and to the storage capacitor Cst.

The gamma reference voltage generator 140 receives the highest level of power voltage VCC of the power voltage supplied to the liquid crystal display panel 110 to generate positive and negative gamma reference voltages, which are supplied to the data driver 120. The data driver 120 supplies data to the data lines DL1-DLm in response to a data driving control signal DDC from the timing controller 190. Further, the data driver 120 samples and latches a digital video data RGB fed from the timing controller 190, and then converts digital video data RGB into analog data voltages based upon a gamma reference voltage from the gamma reference voltage generator 140. The analog data voltages, which are representative of gray scale levels in the liquid crystal cell Clc of the liquid crystal display panel 110, are then supplied to the data lines DL1-DLm.

The gate driver 130 sequentially generates a scanning pulse, such as a gate pulse, in response to a gate driving control signal GDC and a gate shift clock GSC from the timing controller 190. The gate driver 130 provides a high level voltage and a low level voltage of the scanning pulse in accordance with the gate high voltage VGH and the gate low voltage VGL from the gate driving voltage generator 180. The scanning pulse is supplied to the gate lines GL1-GLn.

The backlight assembly 150 is provided at the rear side of the liquid crystal display panel 110, and is powered by an alternating current (AC) voltage supplied to the inverter 160. The backlight assembly 150 irradiates light onto each pixel of the liquid crystal display panel 110. The inverter 160 converts a rectangular wave signal generated within the inverter 160 into a triangular wave signal and then compares the triangular wave signal with a direct current (DC) power voltage VCC, to thereby generate a burst dimming signal proportional to a result of the comparison. If the burst dimming signal determined in accordance with the rectangular wave signal within the inverter 160, then a driving integrated circuit (IC) (not shown) for controlling a generation of the AC voltage within the inverter 160 controls a generation of AC voltage supplied to the backlight assembly 150 in response to the burst dimming signal.

The common voltage generator 170 receives a low-level power voltage VDD to generate a common voltage Vcom, and supplies it to the common electrode of the liquid crystal cell Clc provided at each pixel of the liquid crystal display panel 110. The gate driving voltage generator 180 is also supplied with a low-level power voltage VDD to generate the gate high voltage VGH and the gate low voltage VGL, which are supplied to the data driver 130. More particularly, the gate driving voltage generator 180 provides a gate high voltage VGH that is more than a threshold voltage of the TFTs in each of the pixels of the liquid crystal display panel 110 and a gate low voltage VGL that is less then the threshold voltage of the TFTs. The gate high voltage VGH and the gate low voltage VGL are used for determining a high level voltage and a low level voltage of the scanning pulse generated by the gate driver 130, respectively.

The timing controller 190 supplies a digital video data RGB from a digital video card (not shown) to the data driver 120 while generating a data driving control signal DCC, a gate shift clock GSC and a gate driving control signal GDC using horizontal/vertical synchronizing signals H and V in response to a clock signal CLK. The data driving control signal DCC is supplied to the data driver 120. The data driving control signal DDC includes a source shift clock SSC, a source start pulse SSP, a polarity control signal POL and a source output enable signal SOE. The gate shift clock GSC and the gate driving control signal GDC are supplied to the gate driver 130. The gate driving control signal GDC includes a gate start pulse GSP and a gate output enable signal GOE.

FIG. 3 shows a configuration of a light emitting diode string included in the backlight assembly of the related art liquid crystal display device. As shown in FIG. 3, a light emitting diode string 150 of the related art backlight assembly consists of a plurality of light emitting diodes LED1-LEDn serially connected to each other. Since the plurality of light emitting diodes LED1-LEDn are connected in series with each other, when any one of the plurality of light emitting diodes LED1-LEDn fails as an open circuit, the string of light emitting diodes is turned off. For example, if a second light emitting diode LED2 of the plurality of light emitting diodes LED1-LEDn fails as an open circuit, then the light emitting diodes LED3-LEDn will be turned off.

SUMMARY OF THE INVENTION

Accordingly, the present invention is directed to a backlight assembly driving apparatus for a liquid crystal display that substantially obviates one or more of the problems due to limitations and disadvantages of the related art.

An object of the present invention is to provide a backlight assembly driving apparatus to prevent a light emitting diode string within the backlight assembly of a liquid crystal display device from being turned off due to a light emitting diode in the string failing as an open circuit.

Another object of the present invention is to provide a backlight assembly driving apparatus in which current is redirected from a open circuited light emitting diode in a string of light emitting diodes within the backlight assembly of a liquid crystal display device.

Another object of the present invention is to provide a backlight assembly driving apparatus for normally driving light emitting diodes of a light emitting diode string within the backlight assembly of a liquid crystal display device although one of the light emitting diodes of the string has failed Another object of the present invention is to provide a backlight assembly driving apparatus for maintaining good picture quality despite failure of a light emitting diode within the backlight assembly of a liquid crystal display device.

In order to achieve these and other objects of the invention, a backlight assembly driving apparatus for a liquid crystal display device includes a light emitting diode string of serially connected light emitting diodes, and switching devices connected in parallel to and in a one-to-one correspondence with the light emitting diodes to conduct or turn off current applied to a correspondingly parallel-connected light emitting diode.

A backlight assembly driving apparatus for a liquid crystal display device includes a light emitting diode string of serially connected light emitting diodes, a plurality of optical couplers arranged in one-to-one correspondence with each of the light emitting diodes to generate a bias in accordance with a radiation of said correspondingly arranged light emitting diodes, first switching devices connected to output terminals of the optical couplers in a one-to-one correspondence with the optical couplers that are biased by the light emitting diodes, floating switches connected to output terminals of the first switching devices in one-to-one correspondence with the first switching devices to switch a voltage supplied via the output terminals of the correspondingly connected first switching devices, and second switching devices connected in parallel to and in a one-to-one correspondence with the floating switches.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 4:
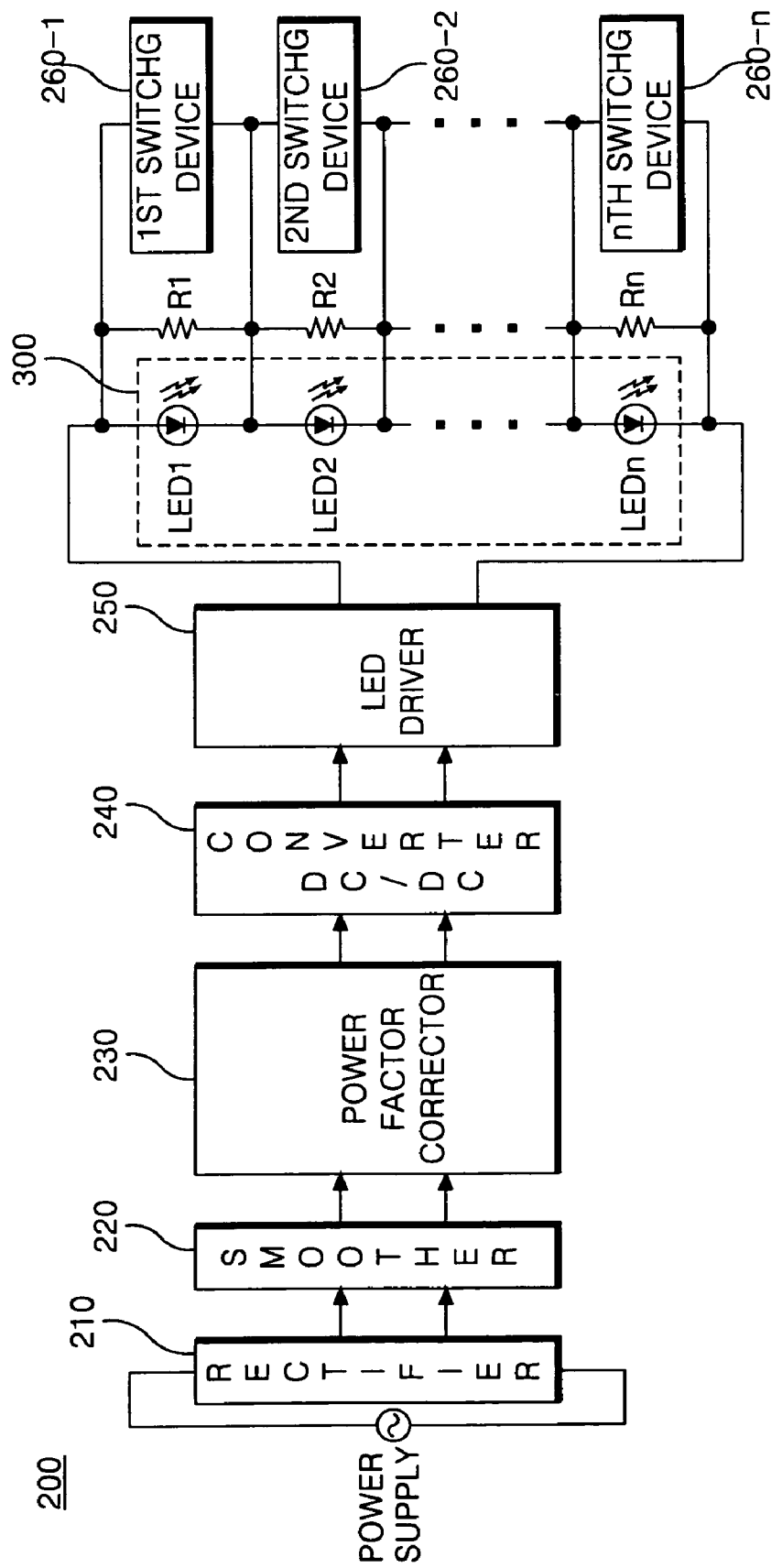
FIG. 4 is a block diagram showing a configuration of a backlight assembly driving apparatus in a liquid crystal display device according to an embodiment of the present invention.

FIG. 4 shows a configuration of a backlight assembly driving apparatus in a liquid crystal display device according to an embodiment of the present invention. As shown in FIG. 4, the backlight assembly driving apparatus 200 includes a rectifier 210 for converting a power voltage, such as 220 VAC, into a direct current (DC) voltage, a smoother 220 for eliminating voltage ripple in the DC voltage converted by the rectifier 210, a power factor corrector 230 for correcting a power factor of the DC voltage outputted from the smoother 220 to output a corrected DC voltage of, for example, 400V, a DC/DC converter 240 for converting the corrected DC voltage of 400V outputted from the power factor corrector 230 into a power DC voltage VCC that is provided to the inverter 160 shown in FIG. 2, and a light emitting diode driver 250 for converting the DC 400V supplied from the DC/DC converter 240 into a light emitting diode driving voltage that is supply it to a light emitting diode string 300. Light emitting diodes LED1-LEDn are serially connected in the light emitting diode string 300.

The backlight assembly driving apparatus 200 includes switching devices 260-1 to 260-n that are connected in parallel to and in a one-to-one correspondence with the light emitting diodes LED1-LEDn. The switching devices 260 include a switch controlled by a light emitted from said correspondingly parallel-connected light emitting diode to conduct or turn off a current applied to the correspondingly parallel-connected light emitting diode. In addition, the backlight assembly driving apparatus 200 includes resistors R1-Rn connected in parallel to and in a one-to-one correspondence with the light emitting diodes LED1-LEDn.

Figure 1:
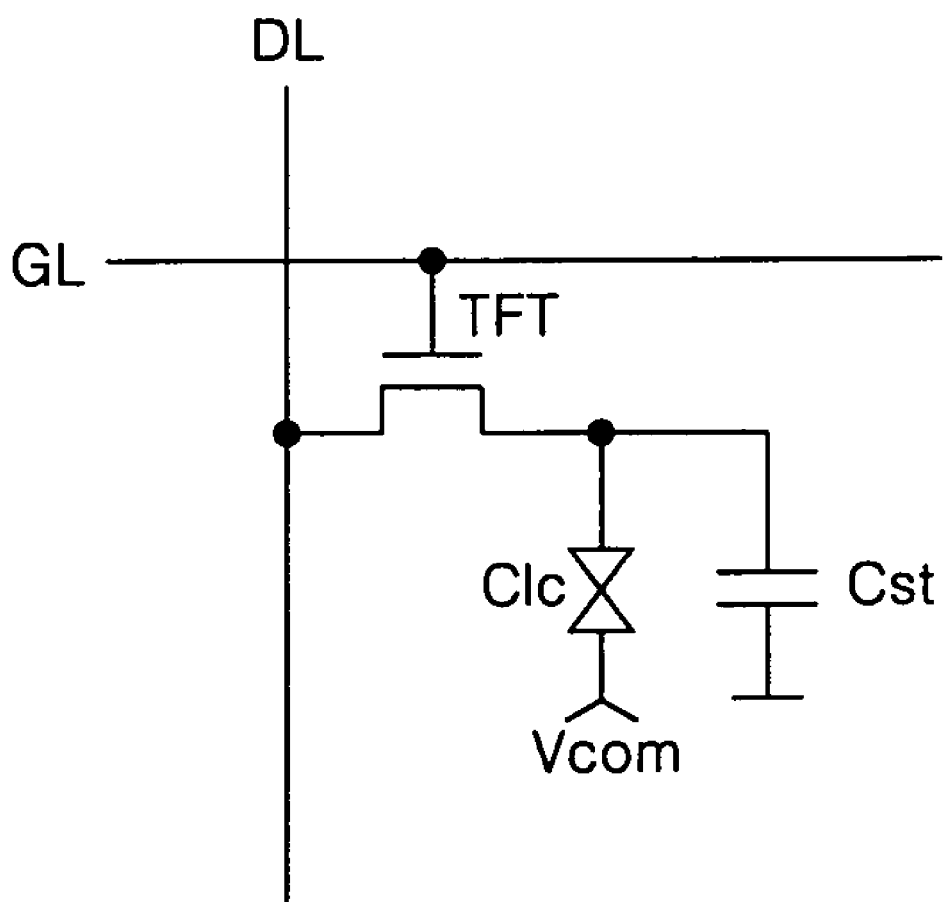
FIG. 1 is an equivalent circuit diagram of a pixel provided at a liquid crystal display device.
Figure 2:
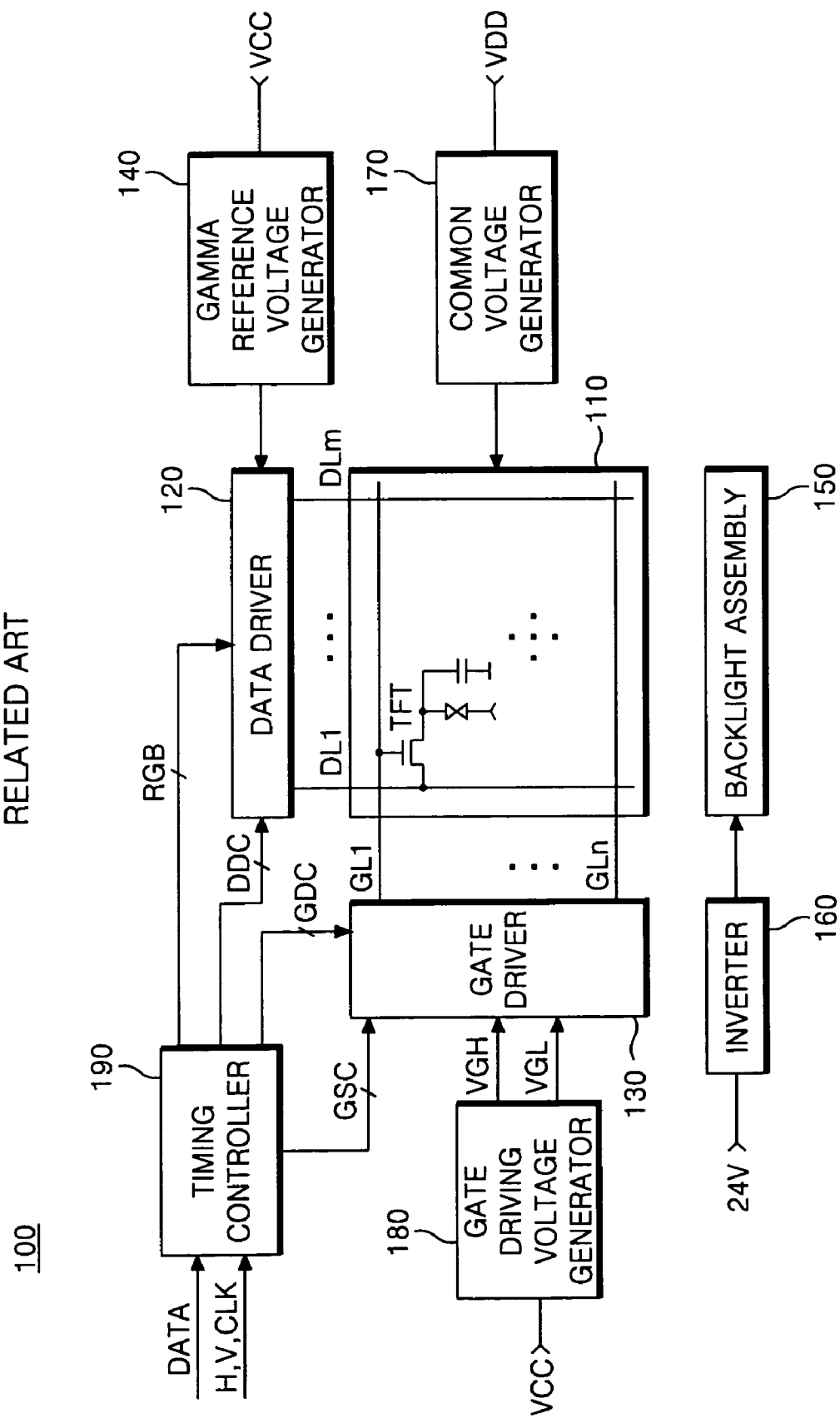
FIG. 2 is a block diagram showing a configuration of the related art liquid crystal display device.
Figure 3:
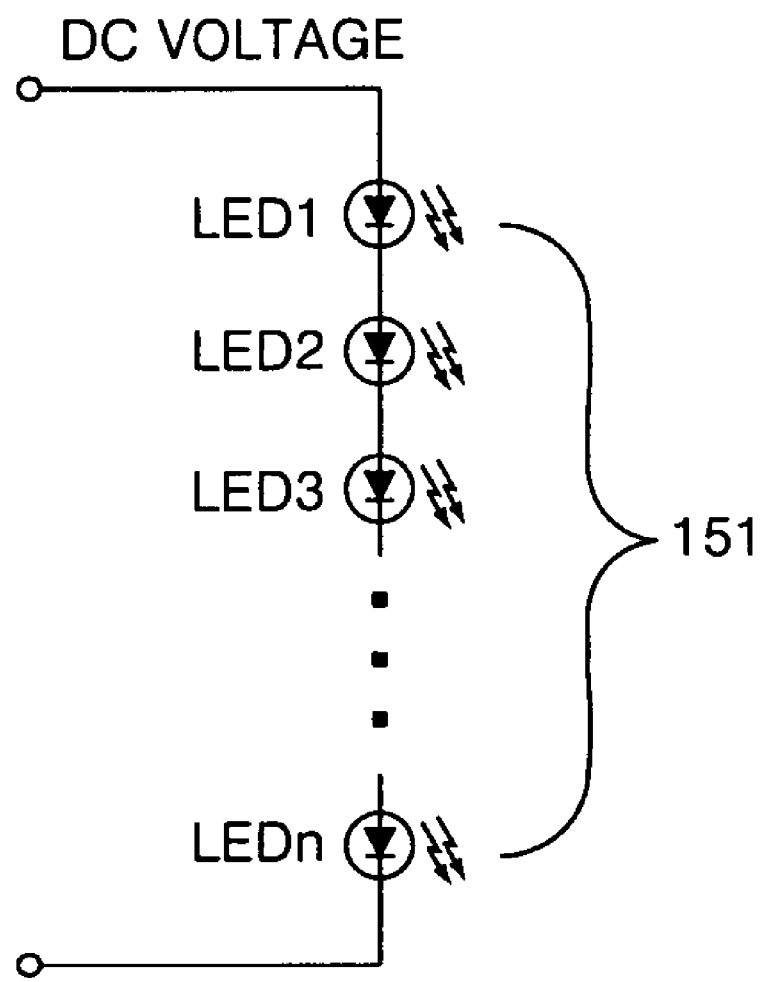
FIG. 3 illustrates a configuration of a light emitting diode string included in a backlight assembly of the related art liquid crystal display device.

The rectifier 210, the smoother 220, the power factor corrector 230 and the DC/DC converter 240 are provided on a power board (not shown) of a system, such as a monitor, a television receiver or the like, employing the liquid crystal display device 100 rather than on the liquid crystal display device 100. The light emitting diode string 300, the switching devices 260-1 to 260-n and the resistors R1-Rn are provided in the liquid crystal display device 100, as shown in FIG. 2. The rectifier 210 converts a commercial power voltage, such as 220 VAC, into a boosting voltage and supplies it to the smoother 220. Since a boosting voltage is made in such a rectifying process, approximately 331 DCV is supplied to the smoother 220 in the case of a commercial power voltage, such as 220 VAC. The smoother 220 eliminates a ripple voltage on the boosting voltage, such as 331 VDC, so as to only apply a DC component of the boosting voltage to the power factor corrector 230. In other words, the smoother 220 passes only a DC component of the boosting component but absorbs and removes AC components. The power factor corrector 230 makes a power factor correction of the boosting voltage applied from the smoother 220 to eliminate a phase difference between the voltage and the current, and supplies the DC 400V to the light emitting diode driver 250. Since the commercial power voltage used in each country may be different, the power factor corrector 230 is configured to supply a constant DC voltage, such as 400 VDC, irrespective of a magnitude of the available commercial power voltage. The DC/DC converter 240 converts the constant DC voltage outputted from the power factor corrector 230 into a supply voltage, such as 24 VDC, to the light emitting diode driver 250. The light emitting diode driver 250 converts the high-level supply voltage from the DC/DC converter 240 to a low-level supply voltage to the light emitting diode string 300.

The switching devices 260-1 to 260-n are connected in parallel to and in a one-to-one correspondence with the light emitting diodes LED1-LEDn. For example, the first switching device 260-1 is connected in parallel to the first light emitting diode LED1. Further, the second switching device 260-2 is connected in parallel to the second light emitting diode LED2. Thus, an nth switching device 260-n is connected in parallel to an nth light emitting diode LEDn.

The resistors R1 to Rn are connected in parallel to and in a one-to-one correspondence with the light emitting diodes LED1 to LEDn and, at the same time, are connected in parallel to and in a one-to-one correspondence with the switching devices 260-1 to 260-n. For example, the first resistor R1 is connected in parallel to the first light emitting diode LED1 and is also connected in parallel to the first switching device 260-1. Further, the second resistor R2 is connected in parallel to the second light emitting diode LED2 and is also connected in parallel to the second switching device 260-2. Thus, an nth resistor Rn is connected in parallel to the nth light emitting diode LEDn and is also connected in parallel to the nth switching device 260-n.

Figure 5:
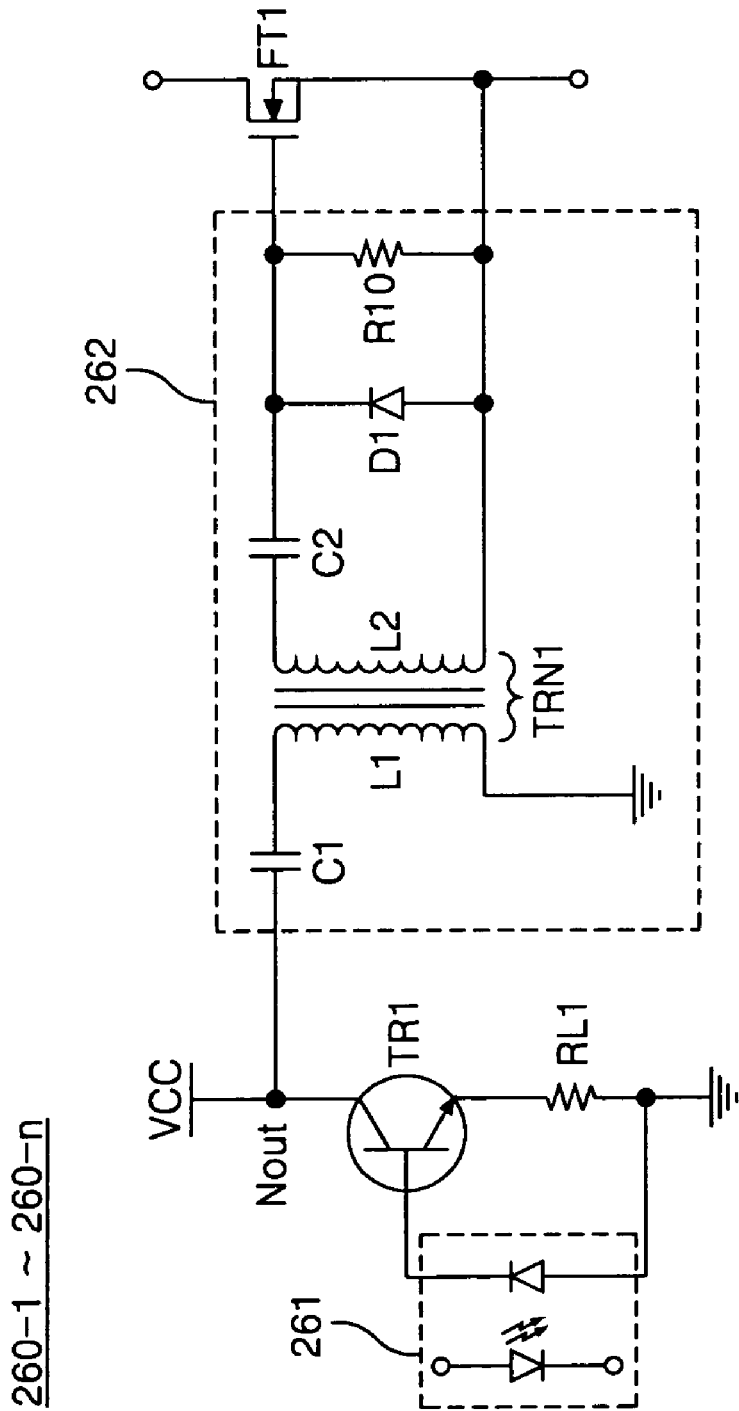
FIG. 5 is a circuit diagram of the switching devices shown in FIG. 4.

FIG. 5 is a circuit diagram of the switching devices shown in FIG. 4. Referring to FIG. 5, each of the switching devices 260-1 to 260-n includes an optical coupler 261 for generating a bias in accordance with whether or not the light emitting diode is irradiating light, a bipolar NPN-type transistor TR1 for providing a driving voltage in accordance with whether a bias is received from the optical coupler 261, a floating switch 262 for regulating a driving voltage supplied via from the output terminal of the bipolar transistor TR1, and an n-channel metal-oxide-semiconductor field effect transistor (NMOSFET) FT1 that switches in response to a regulated driving voltage from the floating switch 262. Further, each of the switching devices 260-1 to 260-n includes a load resistor RL1 connected between an emitter of the bipolar transistor TR1 and ground.

The optical coupler 261 is arranged adjacent to the light emitting diode and generates a bias that is supplied to a base of the bipolar transistor TR1 when the light emitting diode is irradiating light. In contrast, the optical coupler 261 does not generate a bias when the light emitting diode does not irradiate light. The optical coupler 261 and the light emitting diode may be implemented in a single chip.

The transistor TR1 has a collector connected to a power voltage VCC, a base connected to an output terminal of the optical coupler 261 and an emitter connected to the ground. Herein, an output node Nout with a power voltage VCC is at the collector of the transistor TR1. If a bias from the optical coupler 261 is applied to the base of the bipolar transistor TR1, then the bipolar transistor TR1 is turned on, to thereby allow the power voltage at the output node Nout to go to ground. Otherwise, if a bias is not applied from the optical coupler 261, the transistor TR1 is turned off, to thereby allow the power voltage VCC at the output node Nout to be applied to the floating switch 262.

The floating switch 262 includes a capacitor C1 connected in series to the output node Nout of the bipolar transistor TR1, a transformer TRN1 consisting of a primary coil L1 and a secondary coil L2, a capacitor C2 connected in series to one terminal of the secondary coil L2 of the transformer TRN1, a diode D1 connected in parallel to the capacitor C2, and a resistor R10 connected in parallel to the diode D1. One terminal of the primary coil L1 of the transformer TR1 is connected to the capacitor C1 and the other terminal of the primary coil L1 of the transformer TR1 is connected to ground. The diode D1 has an anode connected to an other terminal of the secondary coil L2 of the transformer TRN1 and a cathode connected to the capacitor C2. Such a floating switch 262 regulates a power voltage VCC at the output node Nout of the bipolar transistor TR1 into the gate of the NMOSFET FT1.

The NMOSFET FT1 has a gate connected to the floating switch 262, a drain connected to the anode of the light emitting diode and a source connected to the cathode of the light emitting diode. An NMOSFET FT1 is included in each of the switching devices 260-1 to 260-n. Herein, in the case of the NMOSFET FT1 included in the first switching device 260-1 as an example, the drain of the NMOSFET FT1 is commonly connected to the anode of the light emitting diode LED1 and the output terminal of the light emitting diode 250 while the source thereof is commonly connected to the cathode of the light emitting diode LED1 and the anode of the light emitting diode LED1.

Figure 6:
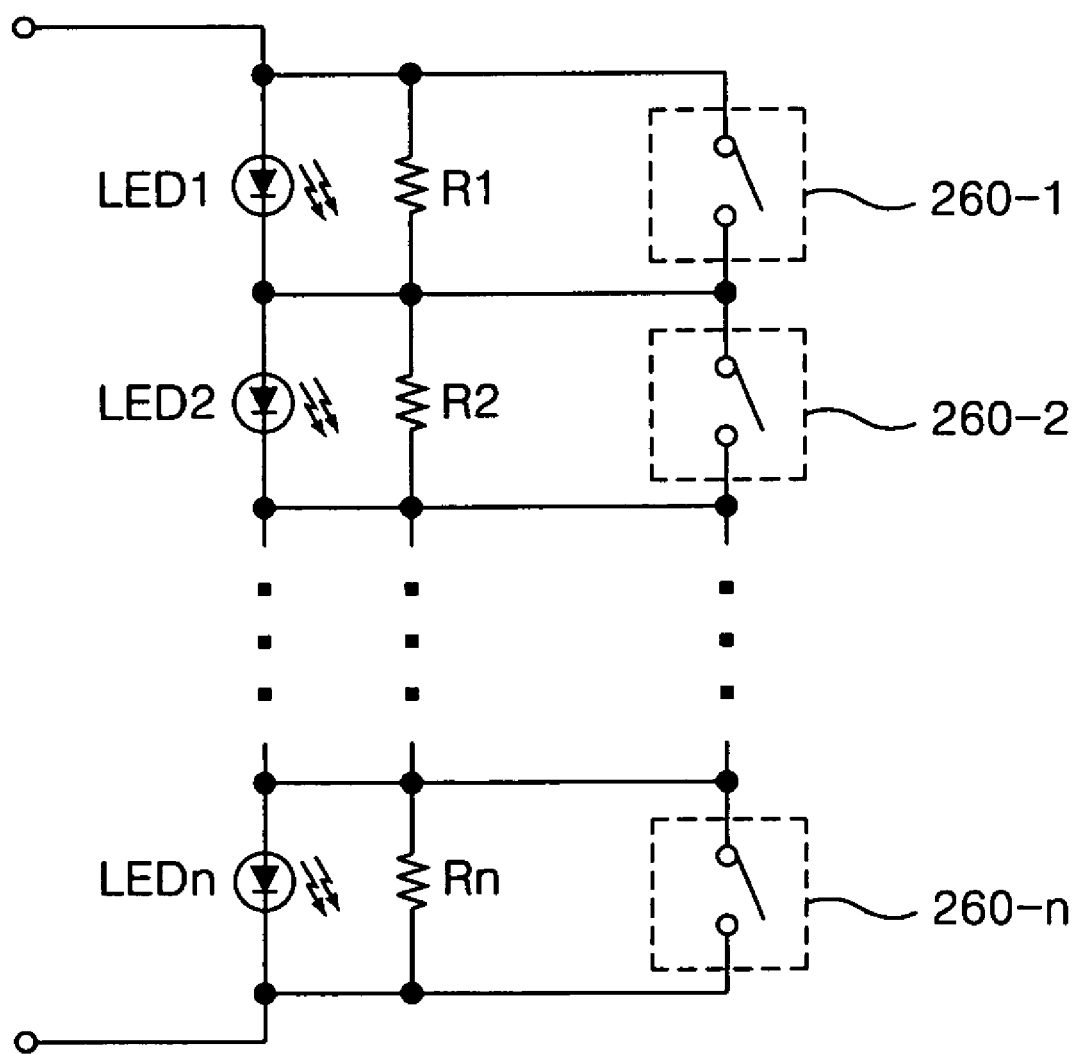
FIG. 6 and FIG. 7 are equivalent circuit diagrams of the light emitting diode string shown in FIG. 4.
Figure 7:
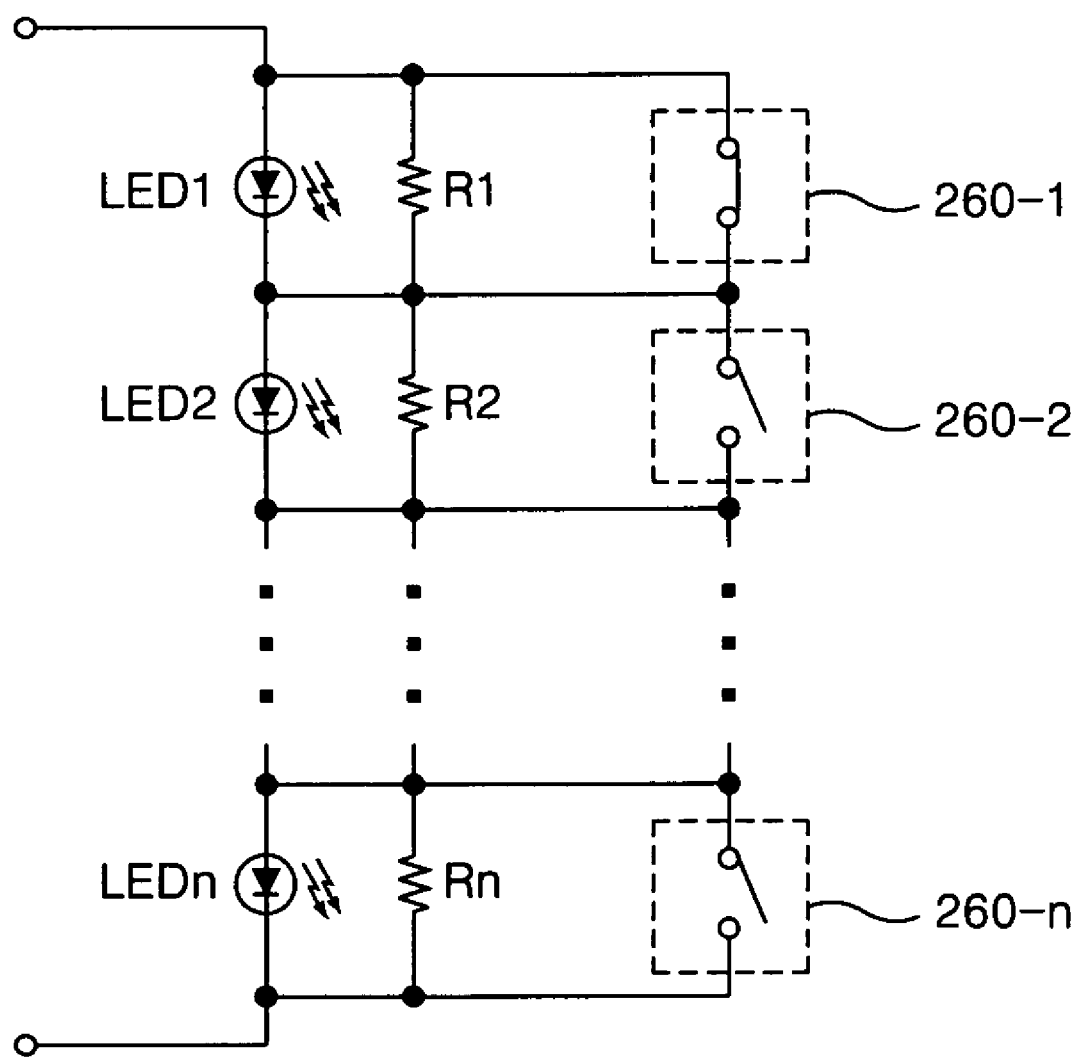

FIG. 6 and FIG. 7 are equivalent circuit diagrams of the light emitting diode string shown in FIG. 4. An operation of the backlight assembly driving apparatus according to an embodiment of the present invention will be described below.

A switching operation of the first switching device 260-1 will be described. The switching devices 260-1 to 260-*n* all function in similar matter.

First, when the first light emitting diode LED1 is normally irradiating light, the optical coupler 261 generates a bias that is applied to the base of the bipolar transistor TR1. The transistor TR1 is turned on by the bias from the optical coupler 261 so that the power supply VCC at the output node Nout of the transistor TR1 is applied to the ground and hence a voltage fails to be applied to the gate of the NMOSFET FT1 so that the NMOSFET FT1 is turned off. Thus, when the first light emitting diode LED1 is irradiating light, the NMOSFET FT1 is turned off. When all of the rest of the light emitting diodes down to the last light emitting diode LEDn are all irradiating light, the equivalent circuit is the light emitting diode string 300 shown in FIG. 6.

On the other hand, when the first light emitting diode LED1 fails to generate light, the optical coupler 261 does not generate a bias. When a bias from the optical coupler 261 is not applied to the base of the transistor TR1, the transistor TR1 is turned off and the voltage of the power supply VCC at the output node Nout of the transistor TR1 is applied via the floating switch 262 to the gate of the NMOSFET FT1, to thereby turn on the NMOSFET FT1. All of the second through nth light emitting diodes LED2-LEDn are normally driven while the first light emitting diode LED1 is bypassed by the turn-on of the NMOSFET FT1, as shown in the equivalent circuit of FIG. 7. Thus, if a first light emitting diode LED1 ceases to emit light, then a voltage previously applied to the anode of the first light emitting diode LED1 is supplied via the first switching device 260-1 to the anode of the 2nd light emitting diode LED2. Accordingly, the backlight assembly driving apparatus according to an embodiment of the present invention applies switching devices 260-1 to 260-*n* and the resistors R1-Rn to the light emitting diode string 300 so that operational light emitting diodes of the light emitting diode string 300 continue to operate even though light emitting diode(s) of the light emitting diode string 300 cease to emit light and/or fail as an open circuit.

As described above, the backlight assembly driving apparatus according to embodiments of the present invention redirects a current previously applied to a malfunction light emitting diode of a light emitting diode string included in the backlight assembly of the liquid crystal display device to the next light emitting diode in the light emitting diode string. The redirection of the current enables the rest of the light emitting diodes in the light emitting diode string can operate normally even though one or more light emitting diodes malfunction. Thus, picture quality is not degraded by the entire string of light emitting diodes being turned off by one or more malfunctioning light emitting diodes in the string.

It will be apparent to those skilled in the art that various modifications and variations can be made in a backlight assembly driving apparatus for a liquid crystal display of the present invention without departing from the spirit or scope of the invention. Thus, it is intended that the present invention cover the modifications and variations of this invention provided they come within the scope of the appended claims and their equivalents.

What is claimed is:

1. A backlight assembly driving apparatus for a liquid crystal display device, comprising:
   a light emitting diode string of serially connected light emitting diodes; and
   switching devices connected in parallel to and in a one-to-one correspondence with the light emitting diodes to conduct or turn off current applied to a correspondingly parallel-connected light emitting diode,
   wherein each of the switching devices include an optical coupler for generating a bias in accordance with light radiation from a corresponding light emitting diode, a first switching device for providing a driving voltage in accordance with whether the optical coupler generates bias, a floating switch for regulating the driving voltage supplied via an output terminal of the first switching device and a second switching device switching in response to the regulated driving voltage from the floating switch.

2. The backlight assembly driving apparatus according to claim 1, further comprising:
   resistors connected in parallel to and in a one-to-one correspondence with the light emitting diodes, and connected in parallel to and in a one-to-one correspondence with the switching devices.

3. The backlight assembly driving apparatus according to claim 1, wherein the corresponding optical couplers respectively supply a bias to the corresponding first switching devices when a light is irradiated from the corresponding light emitting diodes.

4. The backlight assembly driving apparatus according to claim 1, wherein the first switching device includes a bipolar transistor that has a collector connected to a power supply, a base connected to an output terminal of a corresponding optical coupler and an emitter connected to a ground.

5. The backlight assembly driving apparatus according to claim 4, wherein an output node with a power supply voltage is positioned at a collector of the bipolar transistor.

6. The backlight assembly driving apparatus according to claim 5, wherein a bipolar transistor is turned on when a bias from a corresponding optical coupler is applied to a base of the bipolar transistor and turned off when the bias from the corresponding optical coupler is not applied to the base of the bipolar transistor.

7. The backlight assembly driving apparatus according to claim 6, wherein the second switching device includes a field effect transistor having a gate connected to the floating switch, a drain connected to the anode of the light emitting diode and a source connected to the cathode of the light emitting diode.

8. The backlight assembly driving apparatus according to claim 7, wherein the field effect transistor is turned on by a voltage applied to the gate thereof when the corresponding light emitting diode does not radiate light, to thereby switch an applied voltage from an anode of the corresponding light emitting diode.

9. The backlight assembly driving apparatus according to claim 7, wherein the field effect transistor is turned off when the corresponding light emitting diode irradiates light.

10. The backlight assembly driving apparatus according to claim 7, wherein the field effect transistor includes an n-channel metal-oxide-semiconductor field effect transistor.

11. A backlight assembly driving apparatus for a liquid crystal display device, comprising:
   a light emitting diode string of serially connected light emitting diodes;
   a plurality of optical couplers arranged in one-to-one correspondence with each of the light emitting diodes to generate a bias in accordance with a radiation of said correspondingly arranged light emitting diodes;
   first switching devices connected to output terminals of the optical couplers in a one-to-one correspondence with the optical couplers that are biased by the optical couplers;

floating switches connected to output terminals of the first switching devices in one-to-one correspondence with the first switching devices to switch a voltage supplied via the output terminals of the correspondingly connected first switching devices; and second switching devices connected in parallel to and in a one-to-one correspondence with the floating switches.

12. The backlight assembly driving apparatus according to claim 11, further comprising resistors connected in parallel to and in one-to-one correspondence with the light emitting diodes, and connected in parallel to and in a one-to-one correspondence with the second switching devices.

13. The backlight assembly driving apparatus according to claim 11, wherein the corresponding optical couplers respectively supply a bias to the corresponding first switching devices when a light is irradiated from the corresponding light emitting diodes.

14. The backlight assembly driving apparatus according to claim 13, wherein an output node with a voltage of the power supply is positioned at the collector of the bipolar transistor.

15. The backlight assembly driving apparatus according to claim 14, wherein the bipolar transistor is turned on when a bias from a corresponding optical coupler is applied to a base of the bipolar transistor and turned off when the bias from the corresponding optical coupler is not applied to the base of the bipolar transistor.

16. The backlight assembly driving apparatus according to claim 11, wherein the first switching devices include bipolar transistors that each have a collector connected to a power supply, a base connected to an output terminal of a corresponding optical coupler and an emitter connected to a ground.

17. The backlight assembly driving apparatus according to claim 11, wherein each of the second switching devices include a field effect transistor having a gate connected to the corresponding floating switch, a drain connected to an anode of the corresponding light emitting diode and a source connected to a cathode of the corresponding light emitting diode.

18. The backlight assembly driving apparatus according to claim 17, wherein the field effect transistor is turned on by a voltage applied to the gate thereof when a corresponding light emitting diode is not radiating light to thereby switch an applied voltage from an anode of the corresponding light emitting diode.

19. The backlight assembly driving apparatus according to claim 17, wherein the field effect transistor is turned off when the corresponding light emitting diode is irradiating light.

* * * * *